Nov. 8, 1966    D. J. PATTI ET AL    3,284,258
METHOD OF MAKING A PLASTIC ARTICLE HAVING A METALLIC INSERT
Filed Oct. 12, 1962

INVENTORS
DANTE J. PATTI
STEPHEN HORBACH
BY A. J. Nugent
ATTORNEY

United States Patent Office 3,284,258
Patented Nov. 8, 1966

3,284,258
METHOD OF MAKING A PLASTIC ARTICLE HAVING A METALLIC INSERT
Dante J. Patti, Middletown, R.I., and Stephen Horbach, Mountain Lakes, N.J., assignors to Western Electric Company, Incorporated, New York, N.Y., a corporation of New York
Filed Oct. 12, 1962, Ser. No. 230,192
3 Claims. (Cl. 156—84)

The present invention relates generally to plastic articles having metallic inserts, and to methods of making the same. More particularly, the invention relates to spools molded of a thermosetting resin and having a plurality of metallic terminals secured thereto and projecting therefrom, and to methods of making such spools. Accordingly, the general objects of the invention are to provide new and improved articles and methods of such character.

A great number of plastic spools or bobbins of many different types are now being used in the electrical and communications industries, to form a wide variety of electrical components, such as transformers, inductors and resistors. In the past, the necessary terminals were generally headed, knurled or offset cylindrical wires of a fairly stiff character, which were inserted through close fitting apertures in molds used for molding the plastic in place about the terminals. In some instances, as shown in Patent 2,640,903 to W. M. Kohring, terminals were force-fitted into preformed apertures in a plastic mass of resistor material. The plastics commonly used for this type of operation include a wide range of thermoplastic and thermosetting resins; for example, nylon, phenolics, alkyd resins and polydiallyl phthalate resins, frequently glass or fiber-filled for strength and to obtain desirable electrical properties.

Various problems arose in the prior method of molding the spool in place about the terminals, particularly: (1) flashing of the plastic about the terminals during the molding operation; (2) the necessity of providing very close tolerance fits between the terminals and the mold apertures, which apertures tend to become larger during use aggravating the flashing problem; (3) high mold cost due to the difficulty of machining small precise holes; and (4) operating expenses arising from a decreased operating speed required for terminal loading and positioning.

Another object of the invention is to provide a new and improved spool, or other object of a thermosetting resin having metallic terminals or other inserts, and methods of making the same, wherein the terminals are inserted into the spool after molding so as to obviate the flashing and tolerance problems mentioned in the preceeding paragraph and to simplify mold construction and operation.

Another object of the invention is to provide new and improved methods of inserting terminals or similar inserts into thermosetting spools and the like after molding such that a strong mechanical fit is provided to secure the terminals tightly in the spool against both torsional and longitudinal forces applied to the terminals.

With the foregoing and other objects in view, the present invention contemplates the molding of an article of a thermosetting plastic resin of a type which shrinks upon cooling. The article is molded with a cylindrical hole designed to receive an insert, particularly to receive a terminal in a flange of a plastic spool. An elongated metallic insert is utilized, having a transverse cross section at a base portion defining at least three sharp corners which are equidistant from the longitudinal axis of the insert. The distance from the longitudinal axis of the insert to each such corner is preferably between one-half and three thousandths of an inch greater than the radius of the hole in the article. The insert is forced longitudinally into the hole while the article is still hot from the molding operation to position the base portion of the insert in the hole so that the remainder of the insert projects therefrom. The sharp corners of the insert score the sides of the hole as the insert is forced in to provide an interference fit between the insert and the article. As the thermosetting resin cools, it shrinks onto the insert to secure the insert tightly in the hole against torsional and longitudinal forces applied to the insert.

Advantageously, the corners of the insert are notched so that, upon cooling, the plastic shrinks into the notched portions to provide further resistance to a longitudinal pull applied to the insert. According to a preferred embodiment of the invention, the inserts are square in cross section, having a corner-to-corner dimension between two and four mils greater than the diameter of the hole.

Other objects, advantages and features of the invention will be apparent from the following detailed description of a specific embodiment thereof, when taken in conjunction with the appended drawings, in which.

Figure 1:
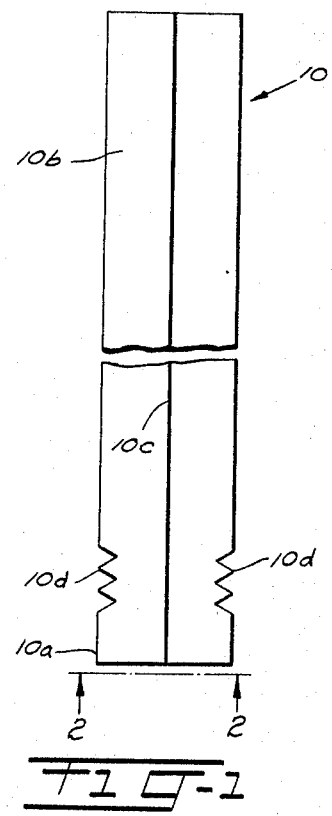
FIG. 1 is a side view of a terminal in accordance with the invention.
Figure 2:
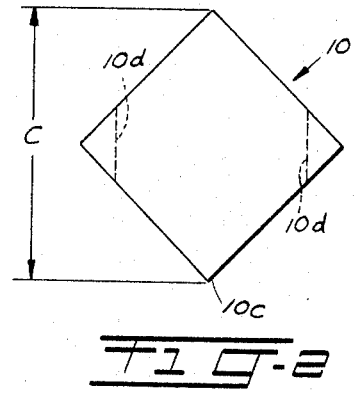
FIG. 2 is an end view of the terminal shown in FIG. 1.
Figure 3:
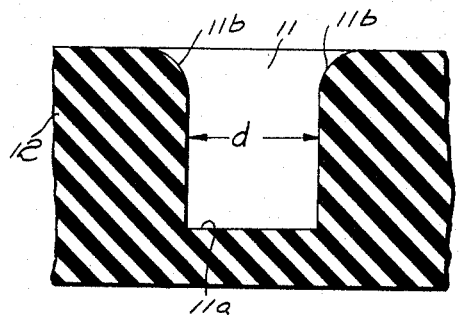
FIG. 3 is a fragmentary cross section through a portion of a molded spool, showing a preferred contour of a hole into which the terminal of FIGS. 1 and 2 is to be inserted; and, FIG. 4 is a side view of a completed spool in accordance with the invention.

Referring now in detail to the drawings, and particularly to FIGS. 1 and 2, there is illustrated an insert or terminal 10 of a type constituting a preferred embodiment of the invention. The terminal 10 is made of a suitable electrically conducting material, such as a tin and copper plated hard brass alloy, and must have a cross sectional area sufficient to provide the necessary stiffness to permit forcing into an undersize circular hole 11 in a flange 12 (FIG. 3) of a spool 13 as will be described in more detail hereinafter.

Figure 4:
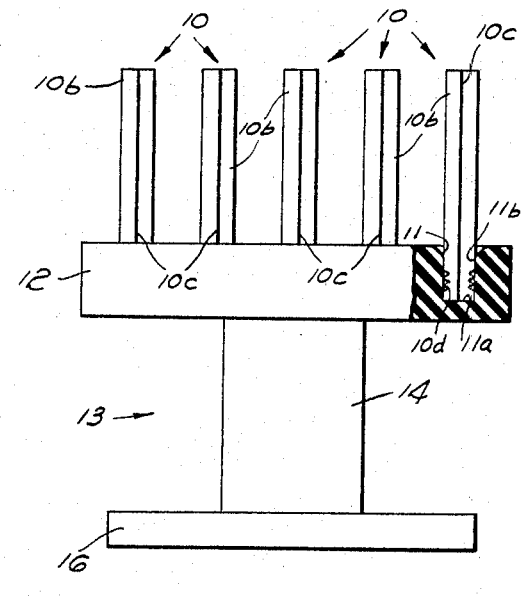

Referring now to FIG. 4, the spool 13 includes the upper flange 12 in which a plurality of the terminals 10—10 are inserted, a hollow square core or drum 14 on which the wire to form the resistor, inductor or the like is wound, and a lower flange 16. Each of the terminals 10—10 is received in a cylindrical hole 11 such as that shown in FIG. 3. The holes 11—11 have a diameter "d" which is between one and six thousandths of an inch smaller than the diagonal dimension "c" of the terminal 10, preferably between two and four thousandths of an inch smaller.

The holes 11—11 are formed in the spool 13 during the molding operation according to conventional techniques by the use of molding pins which extend into the mold cavity and from which the molded spool is later ejected. The plastic used for the spool 13 may be any of the well-known thermosetting resins which shrink upon cooling, as do practically all such resins. One suitable resin is a general purpose phenolic resin, such as A.S.T.M. D-700, type 2, a wood-flour filled phenolic resin. Another resin of interest for many applications is a glass-filled alkyd resin. Another highly suitable resin for many electrical applications is a glass-filled polydiallyl phthalate resin.

The square terminal 10 of FIGS. 1 and 2 is forced longitudinally into the undersize circular hole 11 of the spool 13 after the spool has been molded and while the plastic material is still hot from the molding operation, the term "hot" being relative to the molding temperature and being such a temperature that useful shrinkage upon further cooling is obtained. An approximate molding temperature for general purpose phenolic material would be about 340° F. while the insertion temperature ranges from about 150° F. to 200° F. When the terminal 10 is forced into the hole 11, a base portion 10–a of the terminal is positioned in the hole so that the remainder 10-b of the terminal projects therefrom as shown in FIG. 4. In the specific embodiment illustrated in FIG. 3, the hole 11 is a blind hole having a bottom 11-a against which the base of the terminal 10 is seated; however, through bores may equally well be used, in which case the terminal 10 is merely inserted a desired distance to achieve proper positioning.

Each square terminal 10 has sharp corners 10-c which score the sides of the hole 11 as the terminal is forced in to provide an interference fit between the terminal and the spool. The corners 10-c are as sharp as may be readily obtained commercially, preferably with a corner radius of no more than one or two thousandths of an inch. If desirable, the entrances to the holes 11—11 may be flared as indicated by the entrance portion 11-b in FIG. 3 to facilitate the entry of the terminals in the holes and to center the terminals precisely. As the thermosetting resin cools, it shrinks onto the terminals 10—10 so as to secure them tightly in the holes 11—11 to provide a secure anchorage against both torsional and longitudinal forces which may later be applied to the terminals.

In order to provide an extremely tight fit, a notched portion 10-d is provided along a portion of the length of the base portion of the terminal adjacent to at least two of the opposite corners 10-c, two being the preferred number with the square terminal of FIG. 1. The notches project inward from the sharp corners so that, when the thermosetting resin shrinks upon cooling, it shrinks into the notches to lock the terminal 10 more tightly in the hole 11 against a longitudinal pull.

With the advent of the subject method of pressing oversize square terminals into round holes after molding of the piece part, the manufacturing cost is kept to a minimum. The piece part cost is generally less because the subject method requires less operator and machine time and simpler equipment to insert the terminals in the molded part as compared to inserting them in a hot mold (about 340° F.), and furthermore, the flashing problems mentioned previously are eliminated. Another difficulty which is eliminated is the trouble which the molder experiences in trying to insert a terminal in a close tolerance hole when the terminal has a cut-off burr on the end. A better terminal connection may also result since the intereference fit tends to scrape oxide coatings off the terminal to present a clean surface for soldering.

While one specific embodiment of the invention has been described in detail hereinabove, it will be obvious that various modifications may be made from the specific details described without departing from the spirit and scope of the invention. In particular, while the preferred shape for the terminals is square, other shapes may be used, such as a triangular cross section and other regular polygonal configurations; however, the advantages of the invention are lessened as the number of sides increases. Other shapes than polygonal may also be employed, the important criterion being a transverse cross section defining at least three sharp corners which are equidistant from the longitudinal axis of the insert, the distance from the longitudinal axis of the insert to each corner being between about one-half and three mils greater than the radius of the hole to provide an interference fit of between one and six mils, optimally between two and four mils. One example of a shape other than polygonal which would be effective according to the foregoing definition (although not particularly desirable for an electrical terminal) would be a five-pointed star configuration. The square terminals used in accordance with the preferred embodiment of the invention are especially advantageous when the leads to the terminal are applied by the gun-wrapping method, the pencil-wiring method, or other methods where the leads are physically wrapped about the terminals and a square or other polygonal terminal is required. The difficulties mentioned heretofore in the conventional method of molding spools about round terminals are multiplied when a square terminal is used, particularly the problem of inserting square terminals in close-tolerance square holes in a mold.

What is claimed is:

1. The method of making a plastic article having a metallic insert secured therein and projecting therefrom, which comprises the following steps:

molding the article of a thermosetting plastic resin of a type which shrinks upon cooling, the molded article having a cylindrical hole therein, providing an elongated metallic insert having a transverse cross section at a base portion defining at least three sharp corners which are equidistant from the longitudinal axis of the insert, the distance from the longitudinal axis of the insert to each corner being between one-half and three thousandths of an inch greater than the radius of the hole in the article; and, forcing the insert longitudinally into the hole while the article is still hot from the molding step to position the base portion of the insert in the hole so that the remainder of the insert projects therefrom, the sharp corners of the insert scoring the sides of the hole as the insert is forced in to provide an interference fit between the insert and the article, the thermosetting resin shrinking onto the insert upon cooling to secure the insert tightly in the hole against both torsional and longitudinal forces applied to the insert.

2. The method as recited in claim 1, wherein the transverse cross section of the insert is a square having a corner-to-corner dimension between two and four thousandths of an inch greater than the diameter of the hole.

3. The method of making a plastic spool having one or more metallic terminals secured therein and projecting therefrom, which comprises the following steps:

molding the spool of a thermosetting plastic resin of a type which shrinks upon cooling, the molded spool having one or more cylindrical holes at at least one flange thereof, providing one or more elongated metallic terminals equal in number to the number of holes in the spool, each terminal having a square transverse cross section with a corner-to-corner dimension between two and four thousandths of an inch greater than the diameter of the corresponding hole in the spool, and forcing the terminals longitudinally into the corresponding holes while the spool is still hot from the molding step to position a base portion of each terminal in the corresponding hole so that the remainder of the terminal projects therefrom, the square terminals having sharp corners which score the sides of the holes as the terminals are forced in to provide an interference fit between the terminals and the spool, the thermosetting resin shrinking onto the terminals upon cooling to secure the terminals tightly in the holes against both torsional and longitudinal forces applied to the terminals.

References Cited by the Examiner

UNITED STATES PATENTS

| | | | |
|---|---|---|---|
| 728,568 | 5/1903 | Gulentz | 156—303.1 |
| 1,576,874 | 3/1926 | Stevens | 264—274 |
| 2,247,558 | 7/1941 | Nichols | 156—303.1 |
| 2,304,036 | 12/1942 | Tegarty | 156—293 |
| 2,330,497 | 9/1943 | Larmour | 156—298 |
| 2,457,535 | 12/1948 | Diehert | 339—198 |
| 2,640,903 | 6/1953 | Kohring | 338—273 |
| 2,809,399 | 10/1957 | Mead et al. | 156—293 |
| 2,917,724 | 12/1959 | Jackson | 339—198 |
| 3,007,131 | 10/1961 | Dahlgren et al. | 339—198 |

EARL M. BERGERT, *Primary Examiner.*

ALEXANDER H. BRODMERKEL, *Examiner.*

F. MARLOWE, H. F. EPSTEIN, *Assistant Examiners.*